United States Patent [19]

Arai et al.

[11] Patent Number: 4,617,286

[45] Date of Patent: Oct. 14, 1986

[54] CATALYST FOR POLYURETHANE HAVING DELAY PROPERTY

[75] Inventors: Shoji Arai; Yutaka Tamano; Yukihiro Tsutsumi, all of Yamaguchi, Japan

[73] Assignee: Toyo Soda Manufacturing Co., Ltd., Shinnanyo, Japan

[21] Appl. No.: 647,399

[22] Filed: Sep. 5, 1984

[30] Foreign Application Priority Data

Sep. 8, 1983 [JP] Japan ................................ 58-164187

[51] Int. Cl.$^4$ ...................... C08G 18/14; C08G 18/18; B01J 31/04
[52] U.S. Cl. .................................... 502/167; 521/115; 521/129; 528/53
[58] Field of Search ................. 502/167; 521/115, 129

[56] References Cited

U.S. PATENT DOCUMENTS

| | | | |
|---|---|---|---|
| 2,949,431 | 8/1960 | Britain | 521/129 |
| 3,862,150 | 1/1975 | Bechara et al. | 528/53 |
| 4,098,731 | 7/1978 | Von Bonin et al. | 521/129 |
| 4,165,412 | 8/1979 | Bechara et al. | 521/129 |
| 4,456,696 | 6/1984 | Arbir et al. | 502/167 |
| 4,473,666 | 9/1984 | Casati et al. | 502/167 |

FOREIGN PATENT DOCUMENTS 936649 11/1973 Canada .
0004309 10/1979 European Pat. Off. .
1379985 1/1975 United Kingdom .

OTHER PUBLICATIONS

J. W. Britain and P. G. Gemeinhardt, Catalysis of the Isocyanate–Hydroxyl Reaction, Journal of Applied Polymer Science, vol. IV, No. 11, 207 (1960).

*Primary Examiner*—P. E. Konopka
*Attorney, Agent, or Firm*—Oblon, Fisher, Spivak, McClelland & Maier

[57] ABSTRACT

The disclosed catalyst for polyurethane comprises an organic carboxylic acid salt of a tertiary amine compound and 1-methyl-4-(2-dimethylaminoethyl)piperazine. The tertiary amine compound is selected from the group of triethylenediamine, bis(2-dimethylaminoethyl)ether and N,N,N',N",N"-pentamethyldiethylenetriamine and the organic carboxylic acid is selected from the organic carboxylic acids having 1–20 carbon atoms.

10 Claims, No Drawings

CATALYST FOR POLYURETHANE HAVING DELAY PROPERTY

BACKGROUND OF THE INVENTION

1. Field of the Invention

The present invention relates to a catalyst for polyurethane having a delay property which is useful as a polyurethane foaming catalyst to be used for both flexible and rigid foams.

More particularly, the present invention relates to catalysts for polyurethane foaming having the delay property and which are prepared from an organic carboxylic acid salt of a tertiary amine and 1-methyl-4-(2-dimethylaminoethyl)piperazine. The polyurethane foam is manufactured by the reaction of organic polyisocyanate with a polyol which is carried out in the presence of a foaming agent, catalyst and other auxiliary agents. So far, a number of organic tin compounds and tertiary amine compounds have been known to be used as foaming catalysts for polyurethane and they have been frequently employed for industrial purposes either alone or in the form of a mixture.

2. Description of the Prior Art

Due to the remarkable progress of the polyurethane industry in recent years, polyurethane foams are produced in larger and more complicated forms. On the other hand, however, as short a time as possible is required from molding to demolding, to enhance the productivity of polyurethane foams. This type of demand is met by employing, as the starting polyol, high reactivity aminepolyols having a tertiary amine structure and modified polyols of high reactivity having primary OH groups at the end. The enhanced reactivity and the shortened molding time could be achieved by employing more active diphenylmethane-4,4'-diisocyanates, in place of toluenediisocyanate, and also by employing more active polyisocyanates containing the increased proportion of diphenylmethane-4,4'-diisocyanate, as organic polyisocyanate. When used in those highly reactive starting materials, the conventional polyurethane foaming catalysts such as organic tin compounds and tertiary amine compounds may introduce various problems. For example, when the conventional catalyst is used in highly reactive starting materials such as a mixture of an organic polyisocyanate and a polyol, the polymerization reaction occurs immediately, foams are produced vigorously, and the viscosity increases rapidly. Thus, the mixed liquid cannot be handled easily, cannot reach each corner of a large mold, and the foams produced flow poorly, and therefore some cavities remain in the large molds of complicated forms. In addition, polyurethane foams produced are liable to cause cracks and cleavages. If a low activity catalyst is used to avoid aforementioned disadvantages, the reaction proceeds slowly and the demolding time of the urethane foams is lengthened, leading to lowered productivity. For the purpose of preventing these disadvantages and enhancing the productivity, the development of catalysts having a so-called property has been sought for, which shows weak initial activity of a foaming catalyst for polyurethane and increasing activity as the foaming reaction proceeds.

Catalysts having the delay property are exemplified by the organic carboxylic acid salts of tertiary amines as described in Japanese Laid-Open Patent Application No. Sho 54-130697 and Japanese Patent Publication No. Sho 57-56491. The tertiary amine compound with organic carboxylic acids does not exhibit proper catalytic activity at the initial stage of the polyurethane forming reaction, because a total or part of the amino groups, depending on the circumstance, are blocked with the organic carboxylic acid. As the foam-producing reaction proceeds, however, the temperature is elevated, tertiary amines are dissociated thermally and, as a result, the catalytic activity inherent to the tertiary amine becomes exhibited. Known examples of the catalysts with this delay property are compounds of tertiary amines such as triethylenediamine and bis(2-dimethylaminoethyl)ether with organic carboxylic acids such as formic, cyanoacetic and 2-ethylhexanoic acids. However, these known catalysts having a delay property contain a large amount of organic carboxylic acids to suppress the initial activity of tertiary amine compounds. This fact results in a lower pH value, which may lead to disadvantageous corrosion of a catalyst tank and a foaming vessel. If, on the other hand, the disadvantage is lessened by applying a smaller amount of the organic acid, the pH can be increased but the delay property which is aimed at cannot occur.

SUMMARY OF THE INVENTION

The present inventors' energetic investigations on polyurethane foaming catalysts having an effective delay property have succeeded in finding new compounds. Thus, the addition of 1-methyl-4-(2-dimethylaminoethyl)piperazine (hereinafter designated as TMNAEP) to the organic carboxylic acid salt of a tertiary amine compound can eliminate the mentioned problem, forming a polyurethane foaming catalyst which exhibits a very effective delay property. In other words, the present invention provides a polyurethane foaming catalyst having the delay property which comprises an organic carboxylic acid salt of a tertiary amine compound and TMNAEP.

TMNAEP is a compound and a known amine catalyst which is described in the Journal of Applied Polymer Science, Vol. 4, No. 11, p. 207(1960). However, no catalyst having this delay property prepared by mixing TMNAEP with an organic carboxylic acid salt of a tertiary amine compound has been known so far. Thus, the problem of the known catalyst with a delay property has been solved simply by mixing TMNAEP. Namely, the mixing of TMNAEP with even a known catalyst of the delay property results in an elevated pH and an enhanced effective delay property.

According to the present invention, TMNAEP plays a very important role which cannot be replaced by any other known amine catalysts, including triethylenediamine, bis(2-dimethylaminoethyl)ether, N,N-dimethylcyclohexylamine, N,N,N',N'-tetramethylpropanediamine, N,N,N',N'-tetramethylbutanediamines, N,N,N',N'-tetramethylhexamethylenediamine, N,N,N',N",N"-pentamethyldiethylenetriamine, N,N,N',N",N"-pentamethyldipropylenetriamine, 1,4-dimethylpiperazine, N-(2-dimethylaminoethyl)morpholine, N-(3-dimethylaminoproply)imidazole, N,N-dimethylethanol amine and N,N,N'-trimethylaminoethylethanolamine. In elevating the pH value of these known amine catalysts (even when mixed with a known catalyst of the delay property), the delay property will be lost, and the problem of the delay catalyst cannot be solved at all.

According to the present invention, advantageous effects of mixing TMNAEP with an organic carboxylic acid salt of tertiary amine compound are; first, the pH value of a known catalyst having the delay property can be elevated; second, the initial activity of the catalyst having the delay property can be effectively suppressed by increasing the amount of the organic carboxylic acid used in the preparation of the catalyst having the delay property; third, the initial activity of a known catalyst having the delay property can be suppressed by adding TMNAEP; and fourth, the catalytic activity is enhanced markedly when the polyurethane foam forming reaction proceeds and the reaction temperature is elevated.

The catalyst of the present invention, which has the characteristic features as mentioned above, can exhibit the following meritorious characters in producing polyurethanes: because of the weak initial activity of the catalyst of this invention, the time required from the mixing of the starting material polyol and organic isocyanate to the initiation of the foam forming reaction be extended; on this account the workability and the flow property of the mixed liquid can be improved, such as the corner-to-corner flow of the liquid in a large mold; when the foam forming reaction proceeds and the reaction temperature is elevated, the catalyst of this invention exhibits the catalytic activity due to the thermally dissociated tertiary amine compound and TMNAEP; therefore, the catalytic activity increases remarkably and the foams produced in the foaming reaction can flow into every corner of a complicated mold without leaving a cavity; and on the other hand, the hardening speed of the foam is hastened and it can be removed from the mold in a shorter time, which shows a significant improvement in productivity.

The catalyst of this invention shows a pH value larger than the neutral pH when dissolved in water, therefore, no precaution is required for the corrosion of a reservoir and foaming machine. Therefore, a foaming machine as used so far can be employed. The catalyst of this invention has a low vapor pressure and the odor of amine has been remarkably reduced due to the organic carboxylic acid content. Notorious amine odor which has been generated from conventional tertiary amine catalysts often degrades the working conditions, which however, can be much improved by introducing the catalyst of the present invention. Since the catalyst of this invention is an immiscible stable homogeneous solution, it is easy to handle, and the deactivation and change of composition during storage due to any thermal effect are not feared. In this sense, the catalyst of this invention may be used in combination with a known catalyst such as an organic tin compound and tertiary amine compound, as long as the delay property is not lost.

DETAILED DESCRIPTION OF THE INVENTION

The present invention will be described in detail.

The organic carboxylic acid salts of tertiary amine compounds are composed of those tertiary amine compounds usually employed in producing polyurethane foams to which organic carboxylic acids are added, including a known catalyst with the delay property.

The tertiary amine compounds include, for example, triethylenediamine, bis(2-dimethylaminoethyl)ether, dimethylcyclohexylamine, N,N,N',N'-tetramethylhexamethylenediamine, N,N,N',N'',N''-pentamethyldiethylenetriamine and N,N,N',N'',N''-pentamethyldipropylenetriamine, but the preferred amines are triethylenediamine, bis(2-dimethylaminoethyl)ether and N,N,N',N'',N''-pentamethyldiethylenetriamine.

The organic carboxylic acids used are those saturated, unsaturated and substituted mono- and di-carboxylic acids which have 1 to 20 carbon atoms in the molecule. These organic carb acids include, for example, formic, acetic, propionic, butyric, caproic, 2-ethylhexanoic, caprylic, cyanoacetic, pyruvic, benzoic, oxalic, malonic, succinic and maleic acids, and preferably formic, cyanoacetic and 2-ethylhexanoic acids.

The organic carboxylic acids are used in an amount of 0.05 to 1.0 molar equivalent, preferably 0.1 to 0.8 molar equivalent, per amino group. When the organic carboxylic acid is used in an amount greater than 1.0 molar equivalent, the activity of the catalyst is too weak and the hardening speed is too slow. On the other hand, when the amount is less than 0.05 molar equivalent, the initial activity is not suppressed and therefore an effective delay property is not revealed.

The TMNAEP used in the present invention can be prepared starting from N-(2-aminoethyl)piperazine in a known process such as the Roycart-Walach reaction appearing in U.S. Pat. No. 4,026,840 and the reducing methylation reaction described in West-German Patent No. 2618580.

The amount of TMNAEP to be used is not specified since it depends on the nature of the tertiary amine compound, the organic carboxylic acid and the amount of the latter. Usually 0.01 to 10.0 times as much TMNAEP in moles as the tertiary amine compound is used for the mixture.

Known catalysts having the delay property which are an organic carboxylic acid salt of tertiary amine compound are usually employed together with water or organic solvents to avoid separation of the salt as crystals and the phase separation. In this invention, too, presence of water and organic solvents are freely permitted. Preferable organic solvents include polyols having 2 to 4 hydroxyl groups in the molecule, such as ethyleneglycol, diethyleneglycol, propyleneglycol, dipropyleneglycol, butanediols, 1,6-hexanediol and glycerine. Among the cited compounds, most frequently used are ethyleneglycol, diethyleneglycol, propyleneglycol, dipropyleneglycol and 1,4-butanediol.

The amount of organic solvent contained in the catalyst of this invention is not also particularly restricted, but usually 5 to 70% by weight suffices. An amount less than this range may often not solve the problem concerning the crystallization and the phase separation of the organic carboxylic acid salt of a tertiary amine compound. On the other hand, if the amount exceeds 70% by weight, the tertiary amine content becomes too small so that the effect of the organic solvent is significant to some kinds of polyurethanes in degrading the physical properties of the foams.

The present invention provides a catalyst in the form of a mixture in which TMNAEP is mixed with an organic carboxylic acid salt of tertiary amine compound. But in the production of urethane foams, the TMNAEP and a known catalyst having the delay property composed of an organic carboxylic acid salt of tertiary amine compound may be added separately to a foaming solution.

The catalyst of the present invention can be produced by simply mixing TMNAEP with a known catalyst having the delay property, but may be prepared, for example, as follows: first, a tertiary amine compound is mixed with an organic solvent in an inert atmosphere such as nitrogen and argon; while the vessel is being cooled, an organic solvent is added with an appropriate speed under agitation; and then a predetermined amount of TMNAEP is added for a thorough mixture.

The catalyst having the delay property of this invention thus produced can be used for the production of polyurethane foams. The amount of the catalyst of this invention to be used is usually 0.01 to 10 parts, but preferably 0.05 to 5 parts, to 100 parts of the polyol. Known species of tertiary amines and organic tin compounds which are usually employed as cocatalysts may be used together with the catalyst of this invention as long as the delay property is not lost.

The polyisocyanates with which polyurethane foams are manufactured using the catalyst of this invention may include known organic polyisocyanates, such as, for example, toluenediisocyanate, diphenylmethane-4,4′-diisocyanate, polymerized isocyanate and aliphatic polyisocyanates. On the other hand, polyols may include known species of polyester polyols and polyether polyols. They usually include polyester polyols derived from dibasic acids and polyhydric alcohols; polyether polyols derived from the addition reactions of a polyhydric alcohol, such as glycol, glycerine, pentaerythritol, trimethylolpropane and sucrose, with ethylene oxide or propylene oxide; amine polyols derived from ammonia, aliphatic amine compounds and aromatic amine compounds.

Other additives which may be used, if necessary, in the manufacturing polyurethanes include halogenated methanes such as freon 11 and methylene chloride as foaming agent, organic silicone compounds as surfactant, and flame retarding agents and others. The types of additives and the amounts thereof should remain within the limit of general recognition, and no particular restriction is set as long as the known formula and procedure are observed.

DESCRIPTION OF THE PREFERRED EMBODIMENTS

Explanations below are made with particular reference to Examples and Comparison examples, but the present invention is not restricted to these Examples.

EXAMPLE 1

In a 500 ml round-bottomed glass flask equipped with a stirrer, a predetermined amount of triethylenediamine (TEDA from Toyo Soda Manufacturing Co., Ltd.) and dipropyleneglycol as organic solvent were placed and stirred for mixing under a nitrogen atmosphere. Then, while the flask was being cooled, a predetermined amounts of 95% formic acid and 2-ethylhexanoic acid were added in drops from a dropping funnel, to prepare a liquid catalyst (catalyst notation F-T) consisting of an organic carboxylic acid salt of triethylenediamine.

Next, another liquid catalyst (catalyst notation H-T) was prepared using the same process as above, except that the organic carboxylic acid was solely 2-ethylhexanoic acid.

From each of the thus prepared liquid catalysts (F-T and H-T) consisting of an organic carboxylic acid salt of triethylenediamine, a predetermined amount was mixed with a predetermined amount of TMNAEP to obtain a catalyst liquid (catalyst notation F-NP and H-NP). The liquids were slightly viscous liquids of a yellow to reddish yellow color.

Each of the catalysts in an amount of 2 g was dissolved in 98 g of distilled water and the pH was measured at 25° C. Table 1 shows the compositions of these catalysts and the measured values of pH. It is seen in Table 1 that the pH levels are improved to become larger than neutral, when TMNAEP is added to the F-T and H-T catalysts.

COMPARISON EXAMPLE 1

The same process as in Example 1 was followed, except that TMNAEP was replaced by another amine catalyst to prepare the catalyst liquid.

The amine catalysts employed in place of TMNAEP were dimethylcyclohexylamine (DMCHA), N,N,N′,N″,N″-pentamethyldiethylenetriamine (PMDETA), N,N,N′,N′-tetramethylhexamethylenediamine (TMHMDA) and N,N,N′-trimethylaminoethylethanol amine (TMAEEA).

The composition of the catalysts, pH values and the catalyst notations are shown in Table 1.

EXAMPLE 2

Following the same process as in Example 1 except that triethylenediamine was replaced by bis(2-dimethylaminoethyl)ether (TOYOCAT-ETS from Toyo Soda Manufacturing Co., Ltd.), two catalyst liquids (catalyst notation BF, BH) composed of organic carboxylic acid salts of bis(2-dimethylaminoethyl) ether were prepared. A predetermined amount of TMNAEP was added to each of the catalyst liquids, to prepare respective catalyst liquids (catalyst notation BF-NP and BH-NP). Compositions of these catalysts are shown in Table 2.

EXAMPLE 3

Following the same process as in Example 1 except that triethylenediamine was replaced by N,N,N′,N″,N″-pentamethyldiethylenetriamine, a catalyst liquid (catalyst notation DF) consisting of an organic carboxylic acid salt of N,N,N′,N″,N″-pentamethyldiethylenetriamine was prepared, to which a predetermined amount of TMNAEP was added to prepare a catalyst liquid (catalyst notation DF-NP). Compositions of these catalysts are shown in Table 2.

EXAMPLE 4

Using the catalysts prepared in Example 1, a foaming test was carried out.

Formulation of raw materials was as described below, and the process was followed according to the ordinary hand foaming procedure. Namely, a mixture prepared beforehand from polyol, water, freon, surfactant and others was kept at 20° C. Liquid A was prepared by adding a catalyst to a necessary amount of the above mixture, and an organic isocyanate maintained at 20° C. was named liquid B. A necessary amount of liquid B was added to liquid A, and the mixture was thoroughly mixed by high speed stirring with a homomixer. The mixture was then placed in a 2 liter polyethylene beaker to produce a urethane foam.

(1) Hand foaming conditions
　Mixing: T.K.Labodisper SL, with stirring blades 55φ
　Stirring: 5,000 rpm for 4 seconds
　Vessel: 2 Liter polyethylene beaker
　Temperature of vessel: 30°±2° C.
　Foaming liquids: 60.0 g of A and 57.1 g of B
　Temperature of liquids: 20°±1° C.
(2) Formulation

|  | pbw |
|---|---|
| Actocol GR-73[1] | 100 |
| Water | 1.5 |
| Silicone F-317[2] | 1.5 |
| Freon R-11[3] | 35 |
| Catalyst | varied |
| Takenate 4040A[4] | 131.3 |
| (Index = 110) | |

[1] Sucrose aromatic amine base polyetherpolyol having the hydroxyl value 400 (Takeda Chemical Ind. Ltd.)
[2] Silicone surfactant (Shinetsu Chemical Co., Ltd.)
[3] Produced from Mitsui Fluorochemicals Co.
[4] Crude TDI having the NCO group content 34.7% (Takeda Chemical Ind. Ltd.)

(3) Items of measurement

Cream time (in sec.): Time before the polyurethane foam forming reaction starts

Gel time (in sec.): Time before the polyurethane foam forming reaction starts and gel-formation begins Tack-free time(in sec.): Time before the hardening reaction of polyurethane foam proceeds and the tacky feeling is no longer felt to the touch Foam density $\rho$ (g/l): Bulk density of the urethane foam produced Results obtained by the hand foaming test are summarized in Table 3. The table demonstrates that the catalysts F-NP and H-NP, in comparison with the catalysts F-T and H-T having the same tack-free time, do not shorten the cream time but extend the gel time, and as a result enhance the foam fluidity.

COMPARISON EXAMPLE 2

Using the same process as in Example 4, foaming tests were performed with respect to the catalysts prepared in Comparison example 1, of which the results were compared with those of Example 4. Variations of the cream time and the gel time for the same tack-free time are comparatively shown in Tables 4 and 5. The tables show that the catalysts other than F-NP and H-NP in Example 1 shorten the cream time without exception.

Next, the gel time and the tack-free time were compared with the cream time held at a constant value, and the results are shown in Table 6. The table shows that the catalysts in Comparation Example 1 other than F-NP and H-NP in Example 1 did extend the gel, time and the tack-free time without any exception.

EXAMPLE 5

Using the catalysts prepared in Examples 2 and 3, foaming tests were conducted and the results are shown in Tables 7 and 8. Conditions for the foaming were the same as in Example 4. Results show that catalysts BF-NP, BH-NP and DF-NP exhibit their effect to extend the cream time in comparison with their respective catalysts BF, BH and DF, when compared with respect to equal values of the tack-free time.

TABLE 1

| Catalyst notation | Example 1 | | Comparison example 1 | | | | Example 1 | |
|---|---|---|---|---|---|---|---|---|
| | F—T | F—NP | F—DMCHA | F—PMDETA | F—TMHMDA | F—TMAEEA | H—T | H—NP |
| Composition (Wt. %) | | | | | | | | |
| TEDA[(1)] | 31.5 | 21.0 | 21.0 | 21.0 | 21.0 | 21.0 | 31.5 | 21.0 |
| TMNAEP[(2)] | — | 33.3 | — | — | — | — | — | 33.3 |
| DMCHA[(3)] | — | — | 33.3 | — | — | — | — | — |
| PMDETA[(4)] | — | — | — | 33.3 | — | — | — | — |
| TMHMDA[(5)] | — | — | — | — | 33.3 | — | — | — |
| TMAEEA[(6)] | — | — | — | — | — | 33.3 | — | — |
| DPG[(7)] | 45.9 | 30.6 | 30.6 | 30.6 | 30.6 | 30.6 | 27.9 | 18.6 |
| Formic[(8)] acid | 9.1 | 6.1 | 6.1 | 6.1 | 6.1 | 6.1 | — | — |
| 2-Ethyl-hexanoic acid | 13.5 | 9.0 | 9.0 | 9.0 | 9.0 | 9.0 | 40.6 | 27.1 |
| pH (25° C.) | 5.8 | 8.9 | 10.2 | 9.2 | 10.0 | 9.1 | 5.9 | 8.9 |

| | Comparison example 1 | | | |
|---|---|---|---|---|
| Catalyst notation | H—DMCHA | H—PMDETA | H—PMHMDA | H—TMAEEA |
| Composition (Wt. %) | | | | |
| TEDA[(1)] | 21.0 | 21.0 | 21.0 | 21.0 |
| TMNAEP[(2)] | — | — | — | — |
| DMCHA[(3)] | 33.3 | — | — | — |
| PMDETA[(4)] | — | 33.3 | — | — |
| TMHMDA[(5)] | — | — | 33.3 | — |
| TMAEEA[(6)] | — | — | — | 33.3 |
| DPG[(7)] | 18.6 | 18.6 | 18.6 | 18.6 |
| Formic[(8)] acid | — | — | — | — |
| 2-Ethyl-hexanoic acid | 27.1 | 27.1 | 27.1 | 27.1 |
| pH (25° C.) | 10.1 | 9.2 | 10.0 | 9.1 |

[(1)] Trimethylenediamine (TEDA, Toyo Soda Manufacturing Co., Ltd.)
[(2)] 1-Methyl-4-(2-dimethylaminoethyl)piperazine
[(3)] Dimethylcyclohexylamine
[(4)] N,N,N',N",N"—Pentamethyldiethylenetriamine
[(5)] N,N,N',N'—Tetramethylhexamethylenediamine
[(6)] N,N,N'—Trimethylaminoethylethanolamine
[(7)] Dipropyleneglycol
[(8)] 95% Formic acid

TABLE 2

| Catalyst notation | Example 2 | | | | Example 3 | |
|---|---|---|---|---|---|---|
| | BF | BF—NP | BH | BH—NP | DF | DF—NP |
| Composition (wt. %) | | | | | | |
| BDMEE[1] | 53.1 | 35.4 | 36.0 | 24.0 | — | — |
| PMDETA[2] | — | — | — | — | 53.8 | 36.0 |
| TMNAEP[3] | — | 33.3 | — | 33.3 | — | 33.3 |
| DPG[4] | 22.8 | 15.2 | 15.4 | 10.3 | 24.8 | 16.5 |
| Water | 1.2 | 0.8 | — | — | 7.1 | 4.7 |
| Formic acid[5] | 22.9 | 15.3 | — | — | 14.3 | 9.5 |
| 2-Ethylhexanic acid | — | — | 48.6 | 32.4 | — | — |

[1] Bis(2-dimethylaminoethyl)ether (TOYOCAT-ETS, Toyo Soda Manufacturing Co., Ltd.)
[2] N,N,N',N",N"—Pentamethyldiethylenetriamine
[3] 1-Methyl-4-(2-dimethylaminoethyl)piperazine
[4] Dipropyleneglycol
[5] 100% Formic acid

TABLE 3

| Catalyst | F—T | | | F—NP | | | H—T | | | H—NP | | |
|---|---|---|---|---|---|---|---|---|---|---|---|---|
| Amount of catalyst[1] (pbw) | 3.1 | 2.9 | 2.7 | 3.1 | 2.7 | 2.6 | 3.7 | 3.3 | 3.0 | 3.5 | 3.1 | 2.8 |
| Cream time (sec.) | 7.5 | 8.0 | 8.5 | 7.5 | 8.0 | 8.5 | 8.5 | 9.0 | 9.5 | 8.5 | 9.0 | 9.5 |
| Gel time (sec.) | 38 | 42 | 45 | 39 | 42 | 45 | 38 | 41 | 45 | 39 | 42 | 46 |
| Tack-free time (sec.) | 55 | 60 | 65 | 55 | 60 | 65 | 55 | 60 | 65 | 55 | 60 | 65 |
| Foam density (g/l) | 25.8 | 25.8 | 27.3 | 26.1 | 25.6 | 25.5 | 26.0 | 25.6 | 26.0 | 25.9 | 26.8 | 27.0 |

[1] Amount of catalyst in grams per 100 parts of polyol.

TABLE 4

| Catalyst | Catalyst in Example 1 | | | Catalyst in Comparison example 1 | | | | | | | | | | | |
|---|---|---|---|---|---|---|---|---|---|---|---|---|---|---|---|
| | F—NP | | | F—DMCHA | | | F—PMDETA | | | F—TMHMDA | | | F—TMAEEA | | |
| Amount of catalyst[1] (pbw) | 3.1 | 2.7 | 2.6 | 3.2 | 2.9 | 2.7 | 2.7 | 2.5 | 2.3 | 3.0 | 2.8 | 2.6 | 3.4 | 3.1 | 2.9 |
| Cream time (sec.) | 7.5 | 8.0 | 8.5 | 6.5 | 7.0 | 7.5 | 5.0 | 5.5 | 6.0 | 6.5 | 7.0 | 7.5 | 7.0 | 7.5 | 8.0 |
| Gel time (sec.) | 39 | 42 | 45 | 39 | 42 | 44 | 40 | 43 | 45 | 39 | 42 | 45 | 39 | 43 | 46 |
| Tack-free time (sec.) | 55 | 60 | 65 | 55 | 60 | 65 | 55 | 60 | 65 | 55 | 60 | 65 | 55 | 60 | 65 |
| Foam density (g/l) | 26.1 | 25.6 | 25.5 | 26.2 | 25.6 | 25.3 | 25.5 | 26.1 | 26.6 | 25.0 | 25.1 | 25.6 | 25.1 | 25.3 | 25.4 |

[1] Amount of catalyst in grams per 100 parts of polyol.

TABLE 5

| Catalyst | Catalyst in Example 1 | | | Catalyst in Comparison example 1 | | | | | | | | | | | |
|---|---|---|---|---|---|---|---|---|---|---|---|---|---|---|---|
| | H—NP | | | H—DMCHA | | | H—PMDETA | | | H—TMHMDA | | | H—TMAEEA | | |
| Amount of catalyst[1] (pbw) | 3.5 | 3.1 | 2.8 | 3.5 | 3.2 | 2.9 | 2.9 | 2.7 | 2.5 | 3.1 | 2.9 | 2.7 | 3.7 | 3.4 | 3.1 |
| Cream time (sec.) | 8.5 | 9.0 | 9.5 | 7.5 | 8.0 | 8.0 | 5.0 | 5.5 | 6.0 | 7.5 | 8.0 | 8.5 | 7.5 | 8.0 | 8.5 |
| Gel time (sec.) | 39 | 42 | 46 | 37 | 40 | 42 | 39 | 42 | 44 | 40 | 41 | 44 | 40 | 44 | 47 |
| Tack-free time (sec.) | 55 | 60 | 65 | 55 | 60 | 65 | 55 | 60 | 65 | 55 | 60 | 65 | 55 | 60 | 65 |
| Foam density (g/l) | 25.9 | 26.8 | 27.0 | 25.7 | 26.0 | 26.3 | 25.4 | 26.0 | 26.0 | 25.9 | 26.0 | 25.9 | 25.9 | 25.9 | 26.8 |

[1] Amount of catalyst in grams per 100 parts of polyol.

TABLE 6

| Catalyst | Catalyst in Example 1 | Catalyst in Comparison example 1 | | | | Catalyst in Example 1 | Catalyst in Comparison example 1 | | | |
|---|---|---|---|---|---|---|---|---|---|---|
| | F—NP | F—DMCHA | F—PMDETA | F—TMHMDA | F—TMAEEA | H—NP | H—DMCHA | H—PMDETA | H—TMHMDA | H—TMAEEA |
| Amount of catalyst[1] (pbw) | 2.7 | 2.6 | 1.8 | 2.5 | 2.9 | 3.1 | 2.4 | 1.8 | 2.4 | 2.8 |
| Cream time (sec.) | 8.0 | 8.0 | 8.0 | 8.0 | 8.0 | 9.0 | 9.0 | 9.0 | 9.0 | 9.0 |
| Gel time (sec.) | 42 | 46 | 56 | 46 | 46 | 42 | 49 | 58 | 46 | 51 |

TABLE 6-continued

| Catalyst | Catalyst in Example 1 F—NP | Catalyst in Comparison example 1 | | | | Catalyst in Example 1 H—NP | Catalyst in Comparison example 1 | | | |
|---|---|---|---|---|---|---|---|---|---|---|
| | | F—DMCHA | F—PMDETA | F—TMHMDA | F—TMAEEA | | H—DMCHA | H—PMDETA | H—TMHMDA | H—TMAEEA |
| Tack-free time (sec.) | 60 | 68 | 82 | 67 | 65 | 60 | 79 | 94 | 71 | 71 |

(1)Amount of catalyst in grams per 100 parts of polyol.

TABLE 7

| Catalyst | BF | | | BF—NP | | | BH | | | BH—NP | | |
|---|---|---|---|---|---|---|---|---|---|---|---|---|
| Amount of catalyst(1) (pbw) | 5.2 | 4.5 | 4.0 | 4.3 | 3.8 | 3.3 | 8.0 | 7.1 | 6.4 | 4.8 | 4.3 | 3.8 |
| Cream time (sec.) | 3.5 | 4.0 | 4.5 | 5.0 | 5.5 | 6.0 | 5.0 | 5.5 | 6.0 | 6.0 | 6.5 | 7.0 |
| Gel time (sec.) | 62 | 70 | 78 | 61 | 70 | 80 | 77 | 87 | 96 | 78 | 87 | 95 |
| Tack-free time (sec.) | 70 | 80 | 90 | 70 | 80 | 90 | 90 | 100 | 110 | 90 | 100 | 110 |
| Foam density (g/l) | 24.3 | 25.4 | 25.3 | 25.4 | 26.0 | 25.9 | 28.0 | 27.5 | 27.8 | 27.8 | 27.6 | 27.7 |

(1)Amount of catalyst in grams per 100 parts of polyol.

TABLE 8

| Catalyst | DF | | | DF—NP | | |
|---|---|---|---|---|---|---|
| Amount of catalyst(1) (pbw) | 4.3 | 3.9 | 3.6 | 4.0 | 3.7 | 3.4 |
| Cream time (sec.) | 5.0 | 5.5 | 6.0 | 5.5 | 6.0 | 6.5 |
| Gel time (sec.) | 70 | 78 | 87 | 70 | 80 | 90 |
| Tack-free time (sec.) | 80 | 90 | 100 | 80 | 90 | 100 |
| Foam density (g/l) | 24.1 | 24.4 | 25.3 | 25.9 | 25.9 | 25.9 |

(1)Amount of catalyst in grams per 100 parts of polyol.

What is claimed is:

1. A catalyst for the foaming of polyurethanes, comprising: the combination of an organic carboxylic acid salt of a teritiary amine compound and 1-methyl-4-(2-dimethylaminoethyl)piperazine in 5-70% by weight of an organic solvent, wherein the amount of said 1-methyl-4-(2-dimethylaminoethyl)piperazine compound ranges from 0.01 to 10.0 times the molar amount of the tertiary amine component of said organic carboxylic acid salt.

2. The catalyst of claim 1, wherein said tertiary amine compound is selected from the group consisting of triethylenediamine, bis(2-dimethylaminoethyl)ether, dimethylcyclohexylamine, N,N,N',N'-tetramethylhexamethylenediamine, N,N,N',N'',N''-pentamethyldiethylenetriamine and N,N,N',N'',N''-pentamethyldipropylenetriamine.

3. The catalyst of claim 2, wherein said tertiary amine compound is triethylenediamine, bis(2-dimethylaminoethyl)ether or N,N,N',N'',N''-pentamethyldiethylenetriamine.

4. The catalyst of claim 1, wherein said organic carboxylic acid component of said salt is an organic carboxylic acid having from 1-20 carbon atoms.

5. The catalyst of claim 4, wherein said organic carboxylic acid is formic acid, acetic acid, propionic acid, butyric acid, caproic acid, 2-ethylhexanoic acid, caprylic acid, cyanoacetic acid, pyruvic acid, benzoic acid, oxalic acid, malonic acid, succinic acid or maleic acid.

6. The catalyst of claim 5, wherein said organic carboxylic acid is formic acid or 2-ethylhexanoic acid.

7. The catalyst of claim 1, wherein siad organic solvent is ethyleneglycol, diethyleneglycol, propylene glycol, dipropyleneglycol, a butanediol, 1,6-hexanediol or glycerine.

8. The catalyst of claim 7, wherein said organic solvent is ethyleneglycol, diethyleneglycol, propyleneglycol, dipropyleneglycol or 1,4-butanediol.

9. The catalyst of claim 1, wherein, in the preparation of said organic carboxylic acid salt, the amount of said organic carboxylic acid reacted with said tertiary amine ranges from 0.05 to 1.0 equivalents per 1 equivalent of amino group.

10. The catalyst of claim: 9, wherein the amount of said organic carboxylic acid ranges from 0.1 to 0.8 equivalents.

* * * * *